United States Patent [19]
Thornton et al.

[11] Patent Number: 5,261,485
[45] Date of Patent: Nov. 16, 1993

[54] SLURRY DISTRIBUTOR

[75] Inventors: Lance Thornton, Geneva; Timothy J. Rittof, Lombard; Jay D. Dockendorff, Plano, all of Ill.

[73] Assignee: HPD, Incorporated, Naperville, Ill.

[21] Appl. No.: 747,988

[22] Filed: Aug. 21, 1991

[51] Int. Cl.⁵ .................................... F28F 9/02
[52] U.S. Cl. ....................... 165/174; 165/158; 165/115
[58] Field of Search ............. 165/174, 10, 104.17, 165/158, 115; 62/59

[56] References Cited

U.S. PATENT DOCUMENTS

| | | | |
|---|---|---|---|
| 3,407,875 | 10/1968 | Campbell | 165/174 |
| 3,623,505 | 11/1971 | Barsness et al. | 165/174 |
| 3,630,276 | 12/1971 | Kibin et al. | 165/174 |

Primary Examiner—Albert W. Davis, Jr.

[57] ABSTRACT

An apparatus for distributing a slurry comprising a first section having a dome or cone shape and a plurality of passageways, and a second flat section located below the first section and having a plurality of passageways. The apparatus is useful in distributing a slurry of ice and liquid to a freezing section of an ice crystallizer.

9 Claims, 4 Drawing Sheets

SLURRY DISTRIBUTOR

BACKGROUND OF THE INVENTION

The invention relates to an ice slurry distributor for a freezing apparatus. More particularly, the invention relates to an ice slurry distributor for a falling film ice crystallizer which is used in the treatment of an effluent waste stream.

Effluent wastes, such as those emitted by pulp mills, can be treated by freezing to form a slurry of pure crystallized water and liquid waste. The crystallized water is separated from the liquid waste and then recovered.

A falling film ice crystallizer is an indirect heat exchanger, which generally comprises an ice slurry distributor at the top, for distributing the slurry to a heat exchange apparatus below, and a receiver, located below the heat exchange apparatus, for collecting a slurry containing frozen product and concentrated liquid. A portion of the collected slurry is fed to a separation apparatus and a portion is recycled to the distributor.

In a falling film heat exchanger, a large quantity of fluid flows down and across the heat transfer area. In commercial equipment where a large recirculation flow (100 to 1000 m$^3$/hr) is often used, the slurry must be efficiently and uniformly distributed to the heat transfer elements, which are tubes in the case of tubular type falling film exchangers.

The slurry should be efficiently distributed to the heat exchange element so that the element does not foul or become starved of adequate fluid flow. In the case of ice slurries and other slurries where solids are lighter than the liquid, the distribution of the slurry must be gentle to prevent separation and breakage of the ice crystals or solids. In addition, the ice slurry should be distributed to the heat exchange element quickly to maintain homogeneity of the slurry.

In contrast to prior art distributors, the invention meets these requirements with a minimum attrition of crystals and without expending excessive energy.

SUMMARY OF THE INVENTION

The invention provides a slurry distributor comprising a cone-shaped primary distributor which feeds slurry to a substantially flat secondary distributor located below. The secondary distributor feeds the slurry to the heat exchange element. Each of the distributors contains a plurality of passageways or holes through which the slurry passes.

DETAILED DESCRIPTION OF THE DRAWINGS AND PREFERRED EMBODIMENTS

Figure 1:
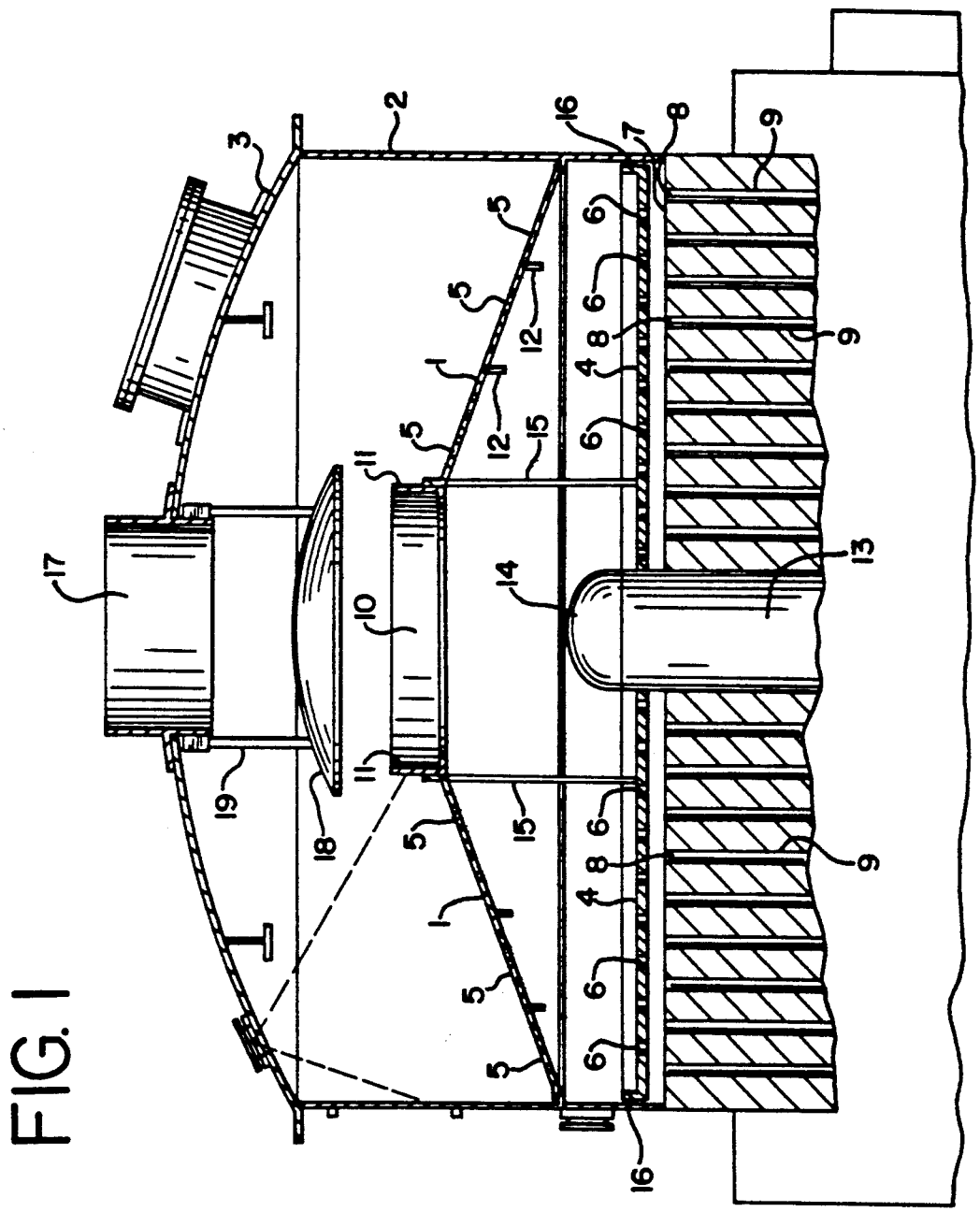
FIG. 1 illustrates one embodiment of the slurry distributor.
Figure 2:
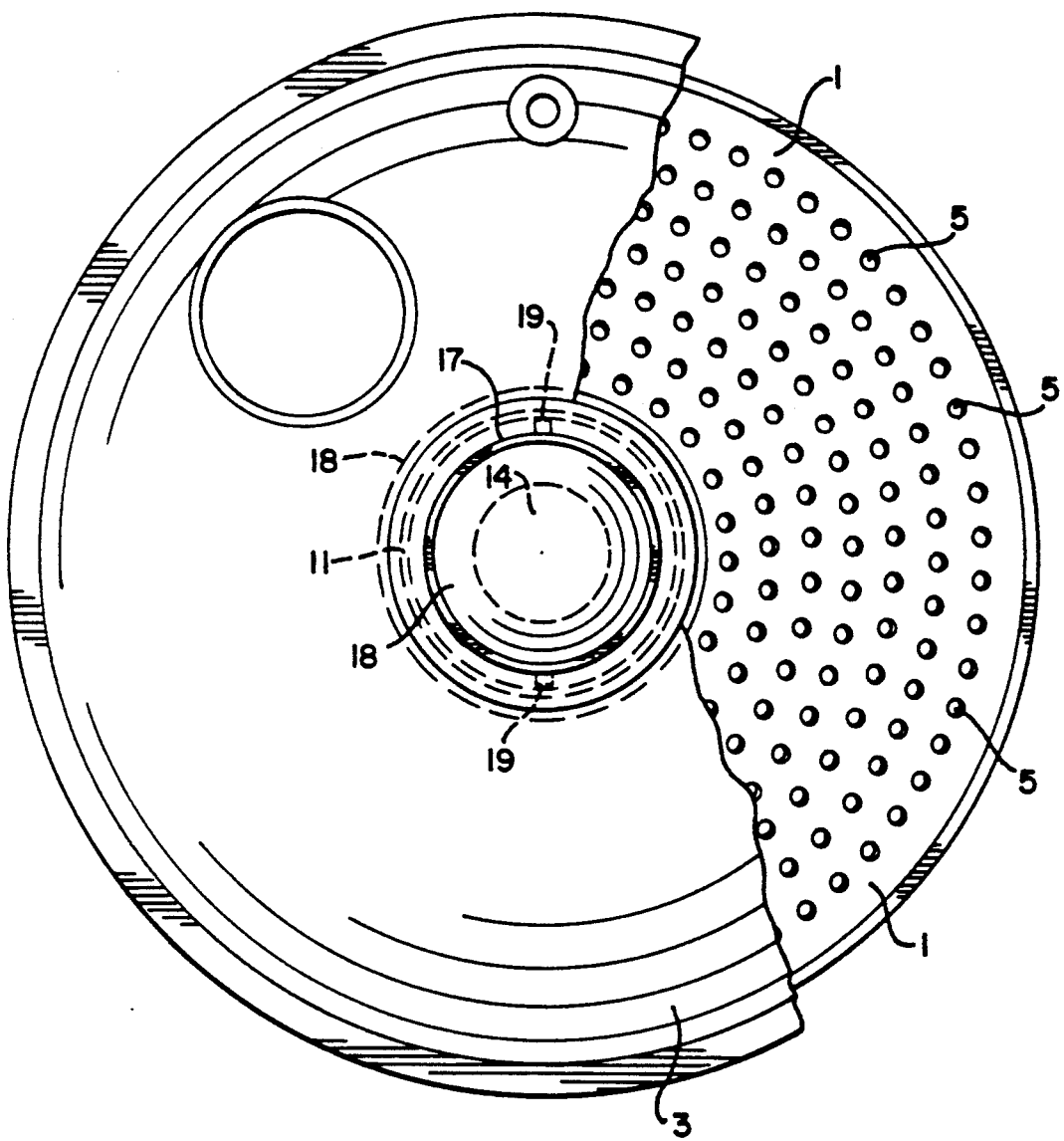
FIG. 2 is a plan view of FIG. 1.

According to FIGS. 1 and 2, a hollow, cone-shaped primary distributor 1 having holes 5 is set inside a tank 2 having a domed cover 3. A flat secondary distributor 4 having holes 6 is positioned below the primary distributor 1 and above a tube sheet 7 having holes 8 and attached tubes 9.

The primary distributor is cone-shaped to reduce the residence time of the slurry in the tank 2 and yet still provide good distribution. A cone shape is not required, and any dome-like structure which achieves the advantages of the invention can be used. When a cone shape is used, the cone angle is not critical, but is preferably within the range of 10° to 60°. The cone is preferably constructed from triangular sheets of material which are fitted together in quadrants to form a hollow cone or a dome. The sheets are supported by supports 15, but may be supported by any type of support such as a roof support (not shown).

The holes in the primary distributor are preferably drilled perpendicular to the sheets, but may be drilled at an angle if desired. The bottom area of the holes may be fitted with flaps 12, which can be closed partially or completely to slow down or stop the flow of the ice slurry.

The cone of the primary distributor is truncated at the apex to create an overflow passageway 10 in the center. An adjustable weir 11 is attached to the side of the passageway 10 to control the overflow of slurry. Slurry flows over the weir 11 to provide for a continuous overflow of floating solids which dumps onto the secondary distributor 4. A pipe 13 supports the secondary distributor 4 and a cap 14 is provided to deflect the slurry overflowing the weir 11 to avoid accumulation of solid material in the center of the secondary distributor 4.

The secondary distributor 4 is a flat plate attached to the support pipe 13, and has an upwardly extending side edge 16 to form a tray. The side 16 preferably extends upward about two inches, but any length may be used. The secondary distributor 4 is preferably a tube sheet containing passageways or holes of about one to two inches in diameter. The secondary distributor is designed to have a negligible ice slurry residence time, and to function essentially as a splash distributor, where the slurry enters the holes almost immediately. Side edges 16 are provided to handle any desired hold-up, but no liquid level in the secondary distributor 4 is required.

The size, number and spacing of the holes in the primary and secondary distributor plates depend upon the amount and type of slurry being fed. Preferably, the holes are between one and two inches in diameter and are unlimited in number. The spacing between the holes may be the same or different. Preferably, the holes in the primary distributor are laid out in a circular pattern, forming about 10 circles of different radius, while the holes in the secondary distributor 4 may be distributed evenly as in a common tube sheet.

The bottom of the tank 2 is fitted to the top of a tube sheet 7 having holes 8 and attached tubes 9. The tube sheet 7 is located a short distance, preferably about 2 to 4 inches below the secondary distributor 4, and the holes 6 in the secondary distributor plate 4 are preferably misaligned with the tube sheet holes 8 below. As with the secondary distributor 4, the number, spacing and diameter size of the tube sheet holes 8 depend upon the amount and type of slurry. However, it is preferred that no pools of liquid or slurry accumulate on the tube sheet 7 below secondary distributor.

Below the tube sheet 7 is the freezer section. Tubes 9 lead downwardly to a lower receiver (not shown), where a portion of the slurry is recirculated to the inlet opening 17. The feed to the inlet opening 17 is an ice slurry, but may be liquid under start-up conditions. Generally, the feed is a combination of recycled ice slurry and cold liquid effluent waste.

In operation, the slurry feed enters the tank 2 through inlet 17 and flows downwardly until it is deflected by deflector 18 which is attached by supports 19. The slurry flows outwardly and accumulates upon the top of the primary distributor 1 as it flows through holes 5 toward the secondary distributor 4. The slurry height builds until it overflows at weir 11, which has an adjustable height to adjust the amount of overflow. The weir may be adjusted to a height of up to 12 inches, but no particular height is preferred as it depends upon the slurry amount and type. Once the slurry passes through the holes 5 or over the weir 11, it quickly enters and passes through the holes 6 in the secondary distributor 4. The slurry then enters the holes 8 which lead to the tubes 9 which form the heat exchange element. After passing through the heat exchange tubes 9, a portion of the slurry is recycled to the inlet 17.

Figure 3:
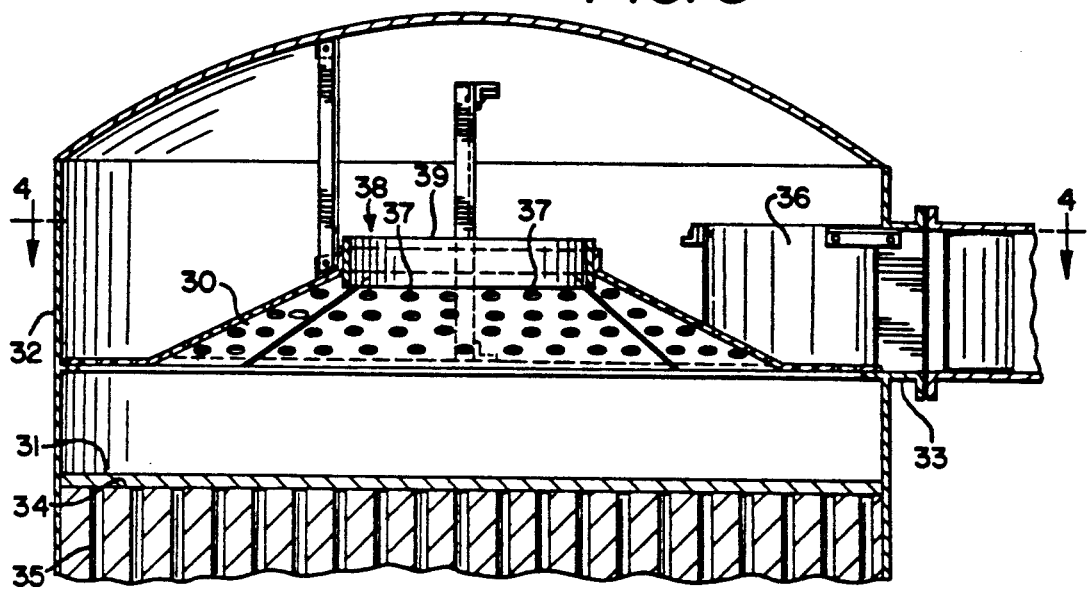
FIG. 3 illustrates another embodiment of the slurry distributor with a baffle arrangement.
Figure 4:
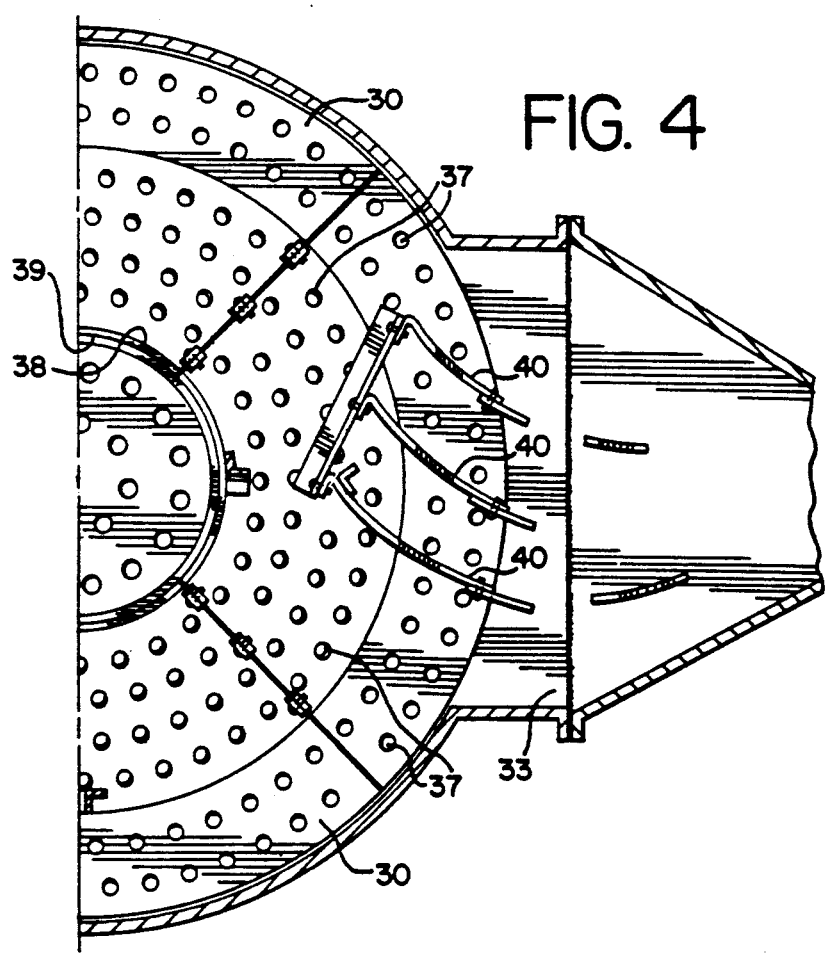
FIG. 4 illustrates a baffle arrangement.
Figure 5:
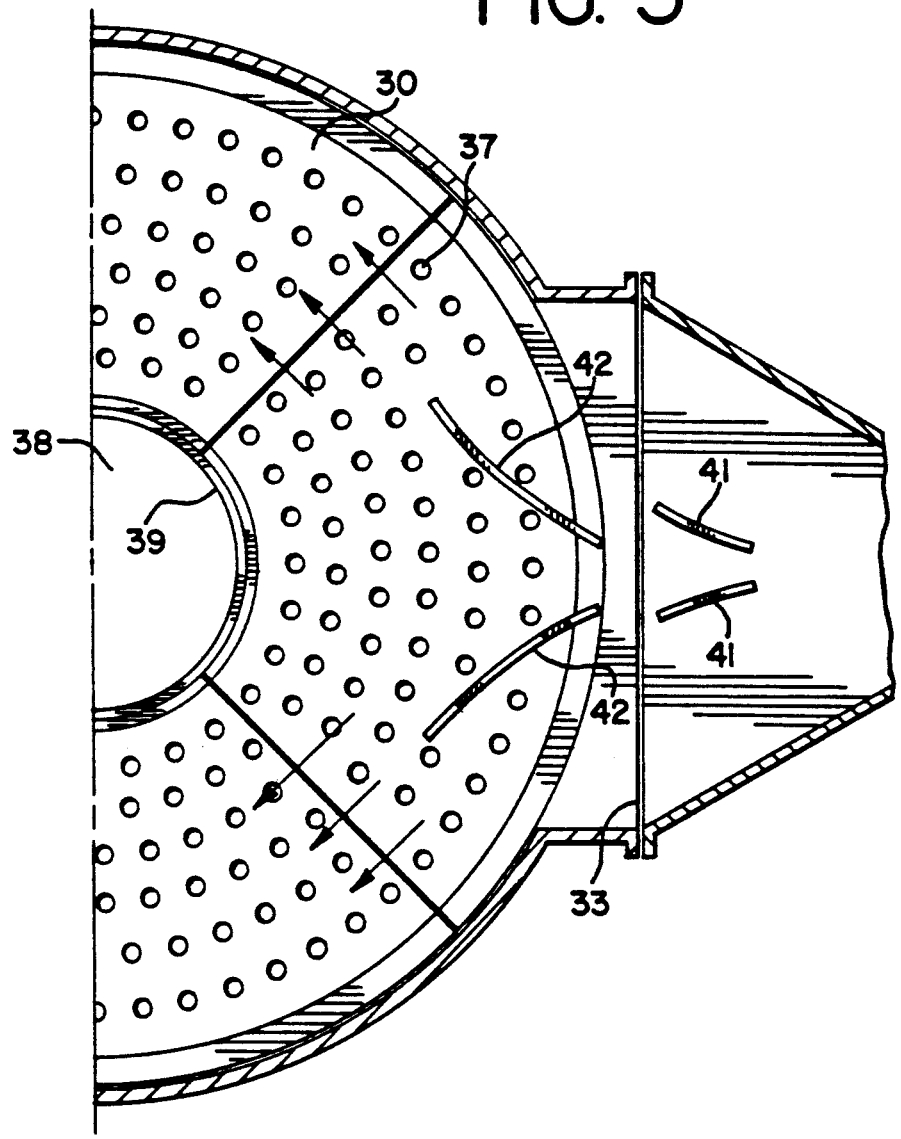
FIG. 5 illustrates a second baffle arrangement.

FIGS. 3 to 5 illustrate an embodiment where the slurry inlet is located at the side rather than the top. According to FIG. 3, a cone-shaped primary distributor 30, having passageways 37, is positioned above a flat secondary distributor 31 in tank 32. The secondary distributor 31 is located above a tube sheet 34 having tubes 35 which function as the heat exchange element. The apex of the cone-shaped primary distributor 30 is truncated to form an overflow passageway 38 which contains an adjustable weir 39. The tank 32 has a side inlet 33 and a baffle arrangement 36 to control the direction of the slurry flow.

Two baffle arrangements are shown in FIGS. 4 and 5. In FIG. 4, three curved baffles 40 guide a portion of the slurry flow in a path to one side of the overflow passageway 38. In FIG. 5, a first set of curved baffles 41 and a second set of curved baffles 42 are arranged within and near inlet 33 to guide a portion the slurry flow to either side of the overflow passageway 38. In both cases, the baffles deflect the flow of the incoming slurry to more efficiently fill the area above the primary distributor. Vertical baffles 43 may also be added to the top of the primary distributor 30 to direct an even flow of the slurry around the periphery. Other means to aid the efficient distribution of the slurry, such as a stirrer or other type of agitator, can also be employed to ensure uniform distribution above the primary distributor.

The slurry distributor is preferred for use with an indirect heat exchange element to freeze an ice slurry, such as the tube falling film ice crystallizer. However, the slurry distributor may be used for any process where effective distribution and homogeneity of the feed are desired.

We claim:

1. An apparatus for crystallizing a slurry of liquid and ice comprising:
   a) a slurry distributor having a cone-shaped first section and a substantially flat second section, said cone of said first section having a passageway at the apex, an open base and a plurality of passageways through the cone surface, and said second section being located below and substantially parallel to the open base of the cone-shaped first section and having a plurality of passageways through the substantially flat portion; and
   b) a heat exchange section located below the slurry distributor and comprising a tube sheet having a plurality of passageways and a plurality of tubes adjoining said passageways, wherein a plurality of the passageways in the tube sheet are substantially misaligned with the passageways in the secondary distributor, 2. The apparatus of claim 1 further comprising a weir at the apex passageway.

3. The apparatus of claim 1 wherein the second section of the slurry disgtributor is a circular disk having an upwardly extending edge at the perimeter.

4. The apparatus of claim 1 further comprising a slurry inlet located above the slurry distributor.

5. The apparatus of claim 4 further comprising a deflector located below the slurry inlet and above the slurry distributor.

6. The apparatus of claim 1 further comprising a slurry inlet located to the side of the slurry distributor.

7. The apparatus of claim 6 further comprising baffles associated with the inlet for directing flow of the slurry.

8. An apparatus for crystallizing a slurry of liquid and ice comprising:
   a) a slurry distributor comprising a tank having a slurry inlet located above the tank;
   b) a slurry deflector located below the slurry inlet;
   c) a cone-shaped primary distributor located below the slurry deflector, said primary distributor having a passageway at the apex, an open base and a plurality of passageways through the cone surface;
   d) a secondary distributor having a substantially flat portion which is located below and substantially parallel to the open base of the primary distrubitror, said secondary distributor having a pluraltiy of passagways through the sbustantially flat portion; and
   e) a heat exchanger located below the slurry distributor and comprising a tube sheet having a plruality of passageways and a plurality of tubes adjoining said passageways, wherein a plurality of the passageways in the tube sheet are substantially misaligned with the passageways in the secondary distributor.

9. An apparatus for crystallizing a slurry of liquid and ice comprising:
   a) a slurry distributor comprising a tank having a slurry inlet located in a side of the tank;
   b) a cone-shaped primary distributor located in the tank and below the slurry inlet, said primary distributor having a passageway at the apex, an open base and a plurality of passageways through the cone surface;
   c) a secondary distributor having a substantially flat portion which is located below and substantially parallel to the open base of the primary distributor, said secondary distributor having a plurality of passageways through the substantially flat portion; and
   d) a heat exchanger located below the slurry distributor and comprising a tube sheet having a plurality of passageways and a plurality of tubes adjoining said passageways, wherein a plurality of the passageways in the tube sheet are substantially misaligned with the passageways in the secondary distributor.

* * * * *

UNITED STATES PATENT AND TRADEMARK OFFICE
CERTIFICATE OF CORRECTION

PATENT NO. : 5,261,485
DATED : November 16, 1993
INVENTOR(S) : Lance Thornton et al.

It is certified that error appears in the above-indentified patent and that said Letters Patent is hereby corrected as shown below:

Claim 8, lines 12-13, please delete "distrubitror" and substitute therefor --distributor--.

Claim 8, line 13, please delete "pluraltiy" and substitute therefor --plurality--.

Claim 8, line 14, please delete "passagways" and substitute therefor --passageways--.

Claim 8, line 14, please delete "sbustantially" and substitute therefor --substantially--.

Claim 8, line 17, please delete "plruality" and substitute therefor --plurality--.

Signed and Sealed this

Second Day of August, 1994

BRUCE LEHMAN

*Attest:*

*Attesting Officer*  Commissioner of Patents and Trademarks